(12) United States Patent
Schwennsen et al.

(10) Patent No.: US 9,139,057 B2
(45) Date of Patent: Sep. 22, 2015

(54) INSTALLATION ADAPTER FOR HITCH

(71) Applicant: Curt Manufacturing, LLC, Eau Claire, WI (US)

(72) Inventors: Kristopher William Schwennsen, Mondovi, WI (US); John William Traynor, IV, Eau Claire, WI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 467 days.

(21) Appl. No.: 13/629,304

(22) Filed: Sep. 27, 2012

(65) Prior Publication Data

US 2014/0084567 A1  Mar. 27, 2014

(51) Int. Cl.
*B23B 49/02* (2006.01)
*B60D 1/06* (2006.01)
*B60D 1/58* (2006.01)

(52) U.S. Cl.
CPC .. *B60D 1/06* (2013.01); *B60D 1/58* (2013.01); *B23B 49/02* (2013.01); *B23B 2247/12* (2013.01); *Y10T 29/49895* (2015.01); *Y10T 408/568* (2015.01); *Y10T 408/569* (2015.01)

(58) Field of Classification Search
CPC ............ B23B 2247/08; B23B 2247/04; B23B 2247/12; B23B 49/02; B23B 49/026; B23B 47/28; Y10T 29/49936
USPC ........................ 408/72 B, 72 R, 115 B, 115 R
See application file for complete search history.

(56) References Cited

U.S. PATENT DOCUMENTS

| | | | | |
|---|---|---|---|---|
| 2,418,234 | A | * | 4/1947 | McCullough ................... 408/97 |
| 4,193,611 | A | * | 3/1980 | Fisk ........................... 280/416.1 |
| 5,116,170 | A | * | 5/1992 | Palmer et al. ............... 408/72 B |
| 5,143,393 | A | | 9/1992 | Meyer |
| 5,161,923 | A | * | 11/1992 | Reccius ....................... 408/72 R |
| 5,366,326 | A | * | 11/1994 | Converse .................... 408/72 B |
| 5,871,310 | A | * | 2/1999 | Mortensen .................... 408/1 R |
| 5,971,418 | A | | 10/1999 | Lindenman et al. |
| 6,095,545 | A | | 8/2000 | Bol, II et al. |
| 6,199,890 | B1 | | 3/2001 | Lindenman et al. |
| 6,447,000 | B1 | | 9/2002 | Dick et al. |
| 6,533,308 | B1 | | 3/2003 | Tambornino |
| 6,669,413 | B1 | * | 12/2003 | Neeld et al. ..................... 408/79 |
| 7,168,727 | B2 | | 1/2007 | Dick |
| 7,775,545 | B2 | | 8/2010 | Dick |
| 2013/0307248 | A1 | * | 11/2013 | McCoy ........................ 280/495 |

* cited by examiner

*Primary Examiner* — Daniel Howell
*Assistant Examiner* — Nicole N Ramos
(74) *Attorney, Agent, or Firm* — Shewchuk IP Services, LLC; Jeffrey D. Shewchuk

(57) ABSTRACT

An installation adapter includes four downwardly extending tabs which mate into the cylindrical ball tube of an underbed portion of a hitch. A center hole on the installation adapter designates a location for drilling a pilot hole upward through the bed of the pickup truck. Four arms on the installation adapter extend outward from the center hole, covering and protecting the top face of the hitch during hole sawing using the pilot hole downward through the bed material. The installation adapter is preferably molded from a brightly colored polymer material.

20 Claims, 5 Drawing Sheets

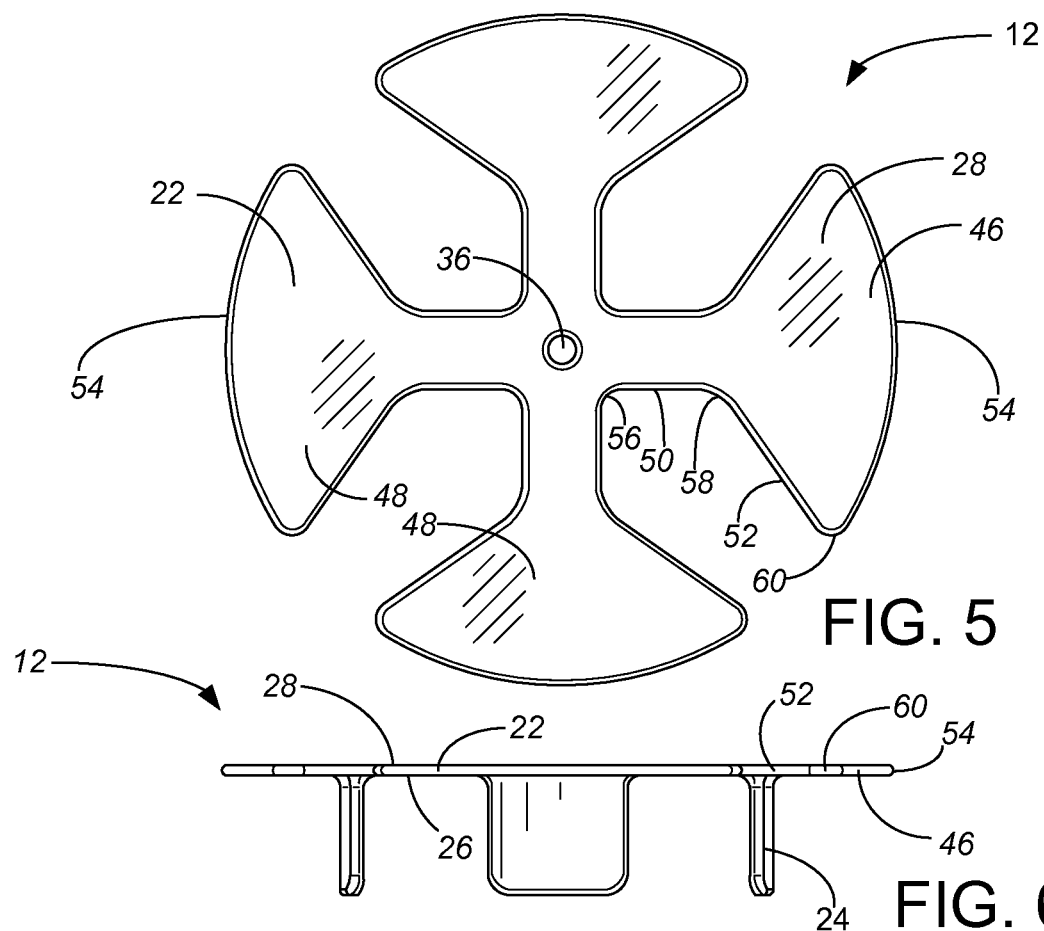
FIG. 5
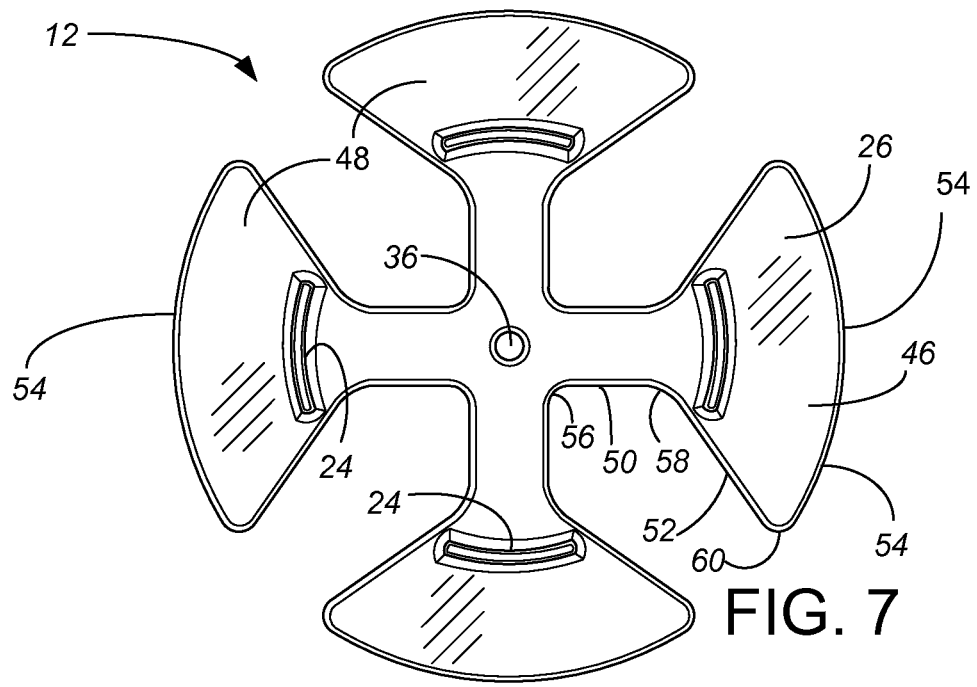
FIG. 6
FIG. 7

INSTALLATION ADAPTER FOR HITCH

CROSS-REFERENCE TO RELATED APPLICATION(S)

None.

BACKGROUND OF THE INVENTION

Many different hitch mechanisms are used on towing vehicles such as pick-up trucks. While some of the hitches attach to the rear of the towing vehicle adjacent the bumper, gooseneck and fifth wheel hitches attach to the towing vehicle closer to its rear axle. With an attachment point at or near the rear axle, the weight of the towed load can be more easily supported by the towing vehicle. For gooseneck hitches, it is desirable to attach a hitch structure directly to the frame of the towing vehicle, under the bed of the pickup truck, with a ball or similar towing coupling extending or extendable above the bed of the pickup truck. For many gooseneck hitches, the ball is made to be removeable or retractable so as to not obstruct the bed of the pickup truck when the hitch is not in use. Examples include U.S. Pat. Nos. 5,143,393, 5,971,418, 6,095,545, 6,199,890, 6,447,000, 6,533,308, 7,168,727 and 7,775,545 each incorporated by reference.

Some hitches are provided as part of the original equipment of the pick-up truck, but many others are installed as after-market equipment into the pickup truck. One of the basic tasks of the after-market gooseneck installer is to cut one or more holes in the bed of the pick up truck which aligns with the location(s) where the hitch will extend through the bed. For instance, some gooseneck hitches require cutting rectangular opening through the bed of the pickup truck, while others require cutting a circular hole (such as 4 inches in diameter) in the bed of the pickup truck.

To keep the bed as functional and attractive as possible, the cut hole should be very precisely positioned to match the desired location of the underbed hitch structure. Depending upon the make or model of pickup truck, there may be little or no flexibility in deciding where to position the underbed hitch structure, due to interference with frame components, exhaust lines, electrical lines, brake lines, fuel lines or other vehicle components. While expert installers may be able to achieve the precise positioning required, novice or less skilled installers often have trouble correctly positioning the hole through the pick-up bed. The typical result is additional work and cutting a larger, less attractive, possibly uncircular hole through the bed to make the hitch mate up through the cut hole.

The difficulty in correctly positioning the hole through the pickup bed is known. One solution is to simply make the critical measurements, from the box of the vehicle and between the wheel wells on each side, as precisely as possible. Another of the proposed solutions is the use of a cardboard or paper template, positioned into the bed of the pickup truck from above and mating with the outline of the bed, which shows the desired position for the hole. Such solutions, however, may require different dimensions and different templates for different pickup trucks, which have different shapes and sizes of beds, and/or slightly different positions on the frame where the underbed hitch structure is mounted. The template solutions also require correct and precise positioning of the template within the bed, which is not always achieved. Better and more efficient solutions are needed.

BRIEF SUMMARY OF THE INVENTION

The present invention is an installation adapter which mates into the underbed hitch structure, as well as a method of using the installation adapter. In the preferred embodiment, the installation adapter is frictionally attachable to the underbed hitch structure, such as with tabs that mate in a friction fit into a cylindrical ball tube of the hitch. The installation adapter includes a designation on its top portion which identifiable from underneath the pickup truck, and which marks a cutting location to cut upward into the pickup truck bed such as for a pilot hole. In the preferred embodiment and method, the installation adapter then protects and shields the hitch during hole-sawing using the pilot hole downward through the bed of the pickup truck, with the hole-sawed hole then precisely positioned to match the positioning of the cylindrical ball tube of the hitch.

BRIEF DESCRIPTION OF THE DRAWINGS

FIG. 5 is a top plan view showing the installation adapter of FIGS. 1-4.

FIG. 6 is a side view of the installation adapter of FIGS. 1-5.

FIG. 7 is a bottom plan view showing the installation adapter of FIGS. 1-6.

While the above-identified drawing figures set forth a preferred embodiments other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 3:
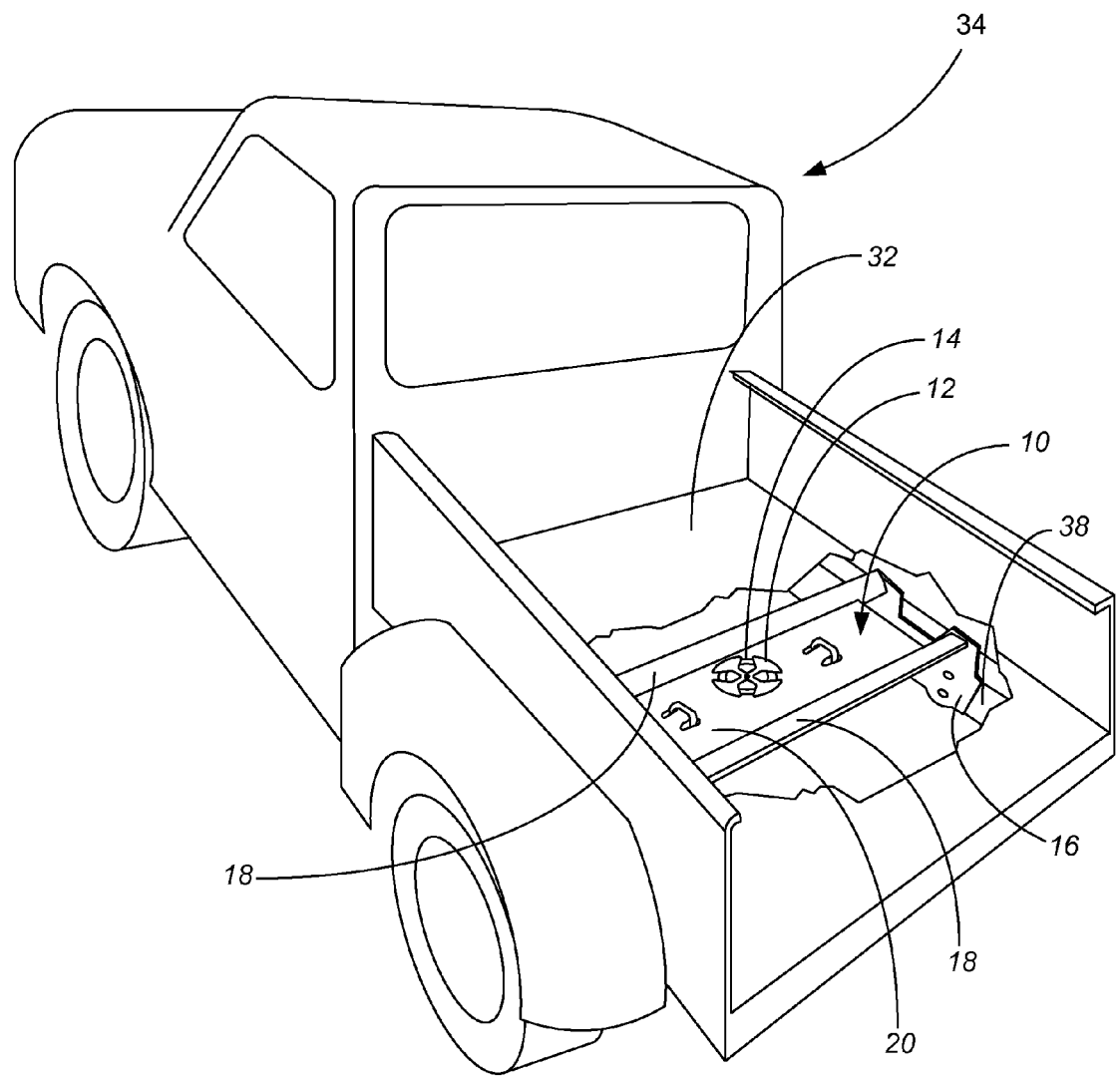
FIG. 3 is a top perspective view of the installation adapter of FIGS. 1 and 2, illustrating use during installation of a hitch beneath and projecting into the bed of a pickup truck, with a portion of the bed broken away.
Figure 4:
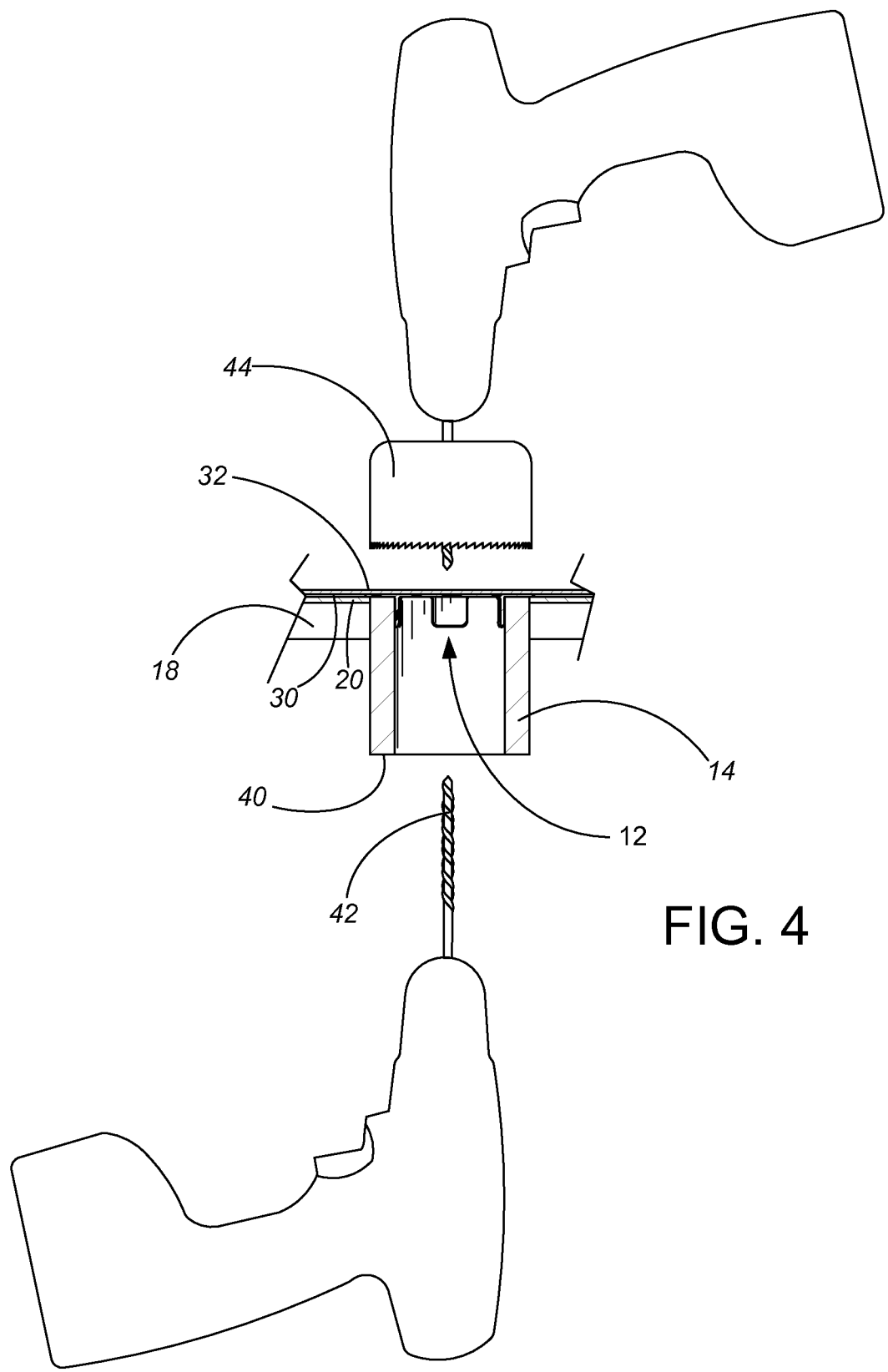
FIG. 4 is a cross-sectional view of the installation adapter and ball receiving tube relative to the bed of a pickup truck, indicating the drilling and hole cutting operations performed in hitch installation using the installation adapter of FIGS. 1-3.

The present invention is a device which mates into the underbed structure of a gooseneck hitch 10 to simplify and increase the accuracy of installation, and a method of using the device. A preferred embodiment of the device as an installation adapter 12 is shown in FIGS. 1-7. As best shown in FIGS. 3 and 4, this embodiment of installation adapter 12 is positioned into the cylindrical hitch ball tube 14 of the underbed portion of a known hitch configuration 10. In general and as known in the art, the underbed portion of the depicted hitch 10 includes two frame mounting flanges 16 (only one shown), two rails 18 extending between the mounting flanges 16, and a base plate 20 extending between the rails 18. The cylindrical ball receiving tube 14 is supported in the base plate 20. A hitch ball (not shown) mates into the ball receiving tube 14, preferably in some sort of a retractable or removable attachment. As will be explained, the principles of the present invention could equally apply in numerous different configurations to simplify and increase the accuracy of installation any a wide variety of different hitch structures.

Figure 1:
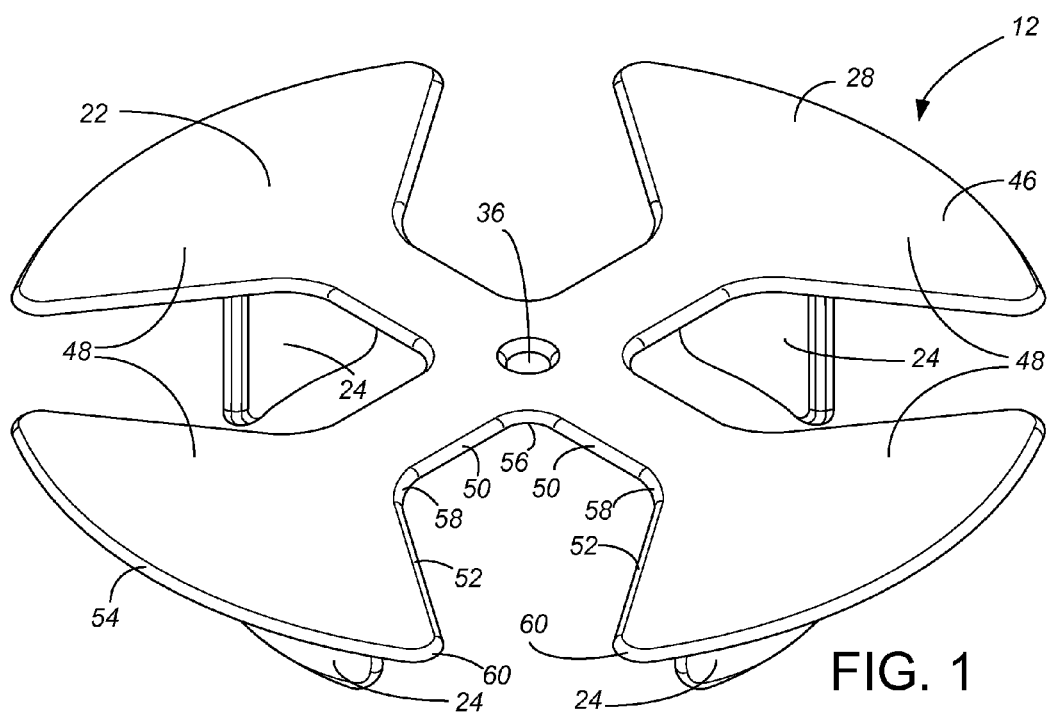
FIGS. 1 and 2 are top and bottom perspective views of a preferred embodiment of an installation adaptor in accordance with the present invention.
Figure 2:
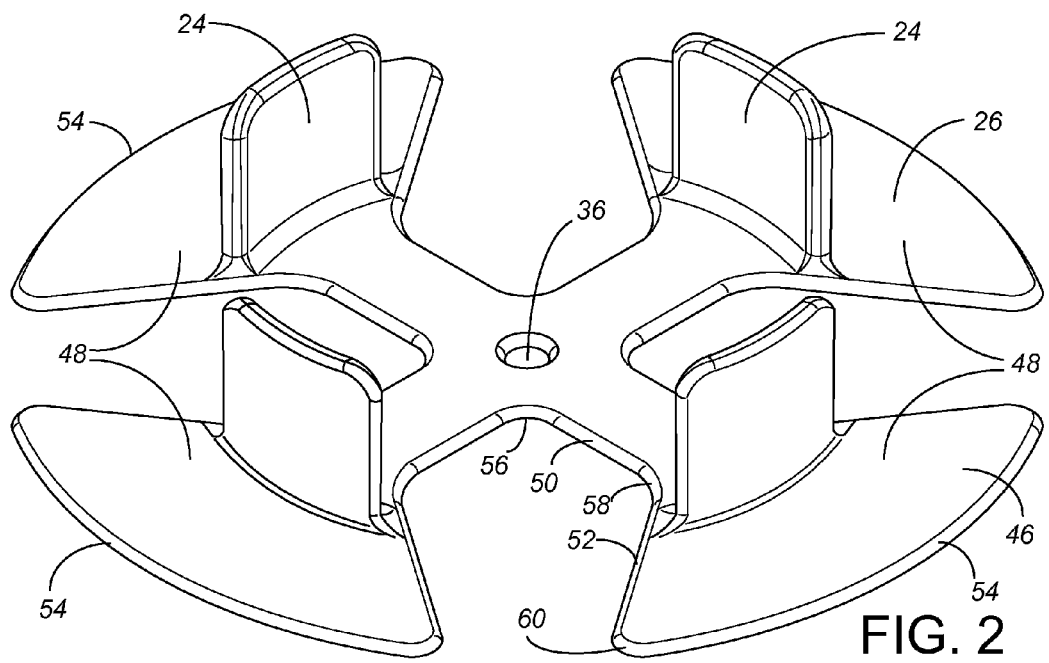

As best shown in FIGS. 1 and 2, the installation adapter 12 for this gooseneck hitch 10 includes a flat top portion 22 with four tabs 24 extending downward from the bottom side 26 of the top portion 22. The four tabs 24 each have a curvature, such that the four tabs 24 jointly define a cylinder. When using the installation adapter 12, the four tabs 24 extend into and are received by the interior of the ball receiving tube 14, i.e, the four tabs 24 jointly provide a cylindrical grip for gripping onto a hitch ball cylinder 14 of the underbed portion of the hitch 10. Alternatively, the tabs 24 could jointly grip onto the outside of the hitch ball tube 14, or could grip onto other locations in the underbed portion of the hitch 10. In the configuration shown, the cylinder defined by the four tabs 24 is about 2¾ inches in diameter, for mating with a 2¾ inch I.D. ball receiving tube 14. The number of tabs is not particularly important, and the four tabs 24 could alternatively be replaced with a single cylindrical projection or a different number of tabs. By having independent tabs 24 of the width shown, the tabs 24 have a greater degree of flexibility during insertion and removal of the installation adapter 12 into and out of the ball receiving tube 14. The length of the tabs 24 is not particularly important, so long as there is sufficient length to provide a friction fit with the ball receiving tube 14 and not so great a length as to interfere with any structure of the hitch 10 within the ball receiving tube 14. In the preferred embodiment, the tabs 24 each extend a length of about ¾ of an inch from the flat top portion 22. The preferred tabs 24 have a width of about ⅞$^{th}$ of an inch, i.e., each tab 24 extends for about 36° around the inner circumference of the ball receiving tube 14. While the thickness of the tabs 24 depends upon the desired flexibility, each tab 24 in the preferred embodiment (which is a molded article formed from a polymer resin such as ABS, nylon, glass filled nylon, polycarbonate, polyester, polyethylene, polypropylene or PVC) has a thickness of about 1/10$^{th}$ of an inch. Alternatively, the installation adapter 12 could be formed of corrugated cardboard or other low cost materials.

The top side 28 of the top portion 22 is generally planar. During use and as depicted in FIG. 4, the top side 28 of the top portion 22 abuts the bottom side 30 of the bed 32 of the pickup truck 34. Alternatively, the top portion 22 could have a non-planar shaped profile which matches the shaped profile (not shown) on the bottom side 30 of the particular make/model pickup truck 34 for which the installation adapter 12 is being used. By having a generally planar top side 28, the installation adapter 12 can be used with a wide variety of pickup trucks. Indeed, the term "pickup truck" as used herein is not intended to be limiting, but rather is intended to cover any towing vehicle have a bed formed of a sheet material such that the hitch has an underbed support structure forming a gooseneck hitch by extending through the bed.

One primary role of the top portion 22 is to designate a location for drilling a pilot hole, which designation can be seen from underneath during installation of the hitch 10. This designation could be provided by a marking or coloring visible on the bottom surface 26 of the top portion 22. In the preferred embodiment, the designation is provided by a central hole 36, such as at a diameter of about ⅙$^{th}$ of an inch.

During installation of the hitch 10, the installer positions the installation adapter 12 into the ball receiving tube 14 on the hitch 10, and then positions the hitch 10 relative to the frame 38 on the underside of the bed 32 of the pickup truck 34, with the top surface 28 of the installation adapter 12 in contact with the bottom surface 30 of the pickup truck bed 32. If desired, the underbed portion of the hitch 10 can be pushed upward, biasing the bed 32 of the pickup truck 34 slightly upward just above the ball receiving tube 14. The hitch 10 can then either be held in place, or more preferably is mounted to the frame 38 in this position.

Figure 4A:
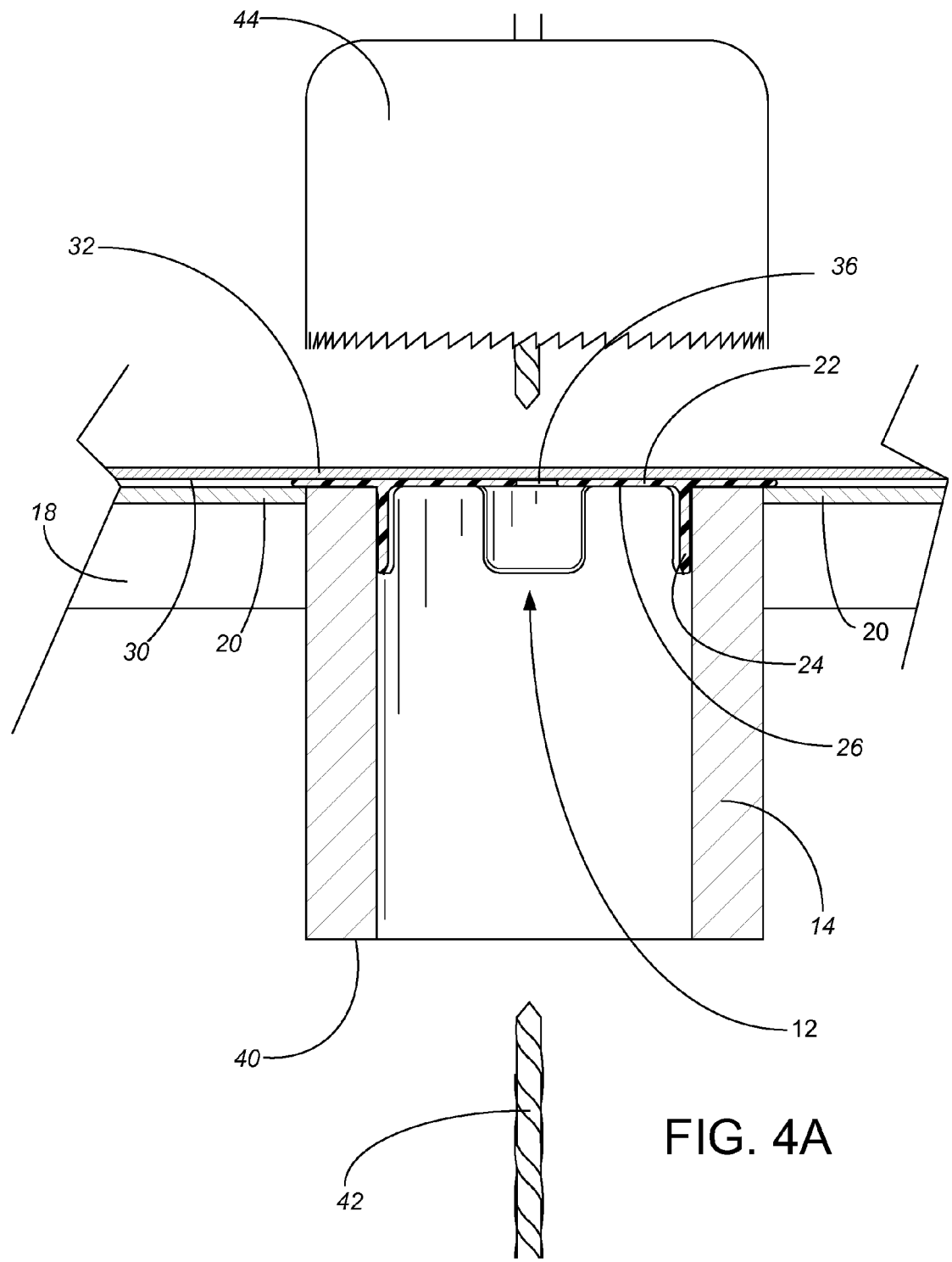
FIG. 4A is an enlargement of a portion of FIG. 4

In the design of the hitch 10, the ball receiving tube 14 is a cylinder which is open on its bottom side 40 as shown in FIGS. 4 and 4A. Even with the poor lighting which is often available underneath the pickup truck bed 32, the installer can see (or in some occasions feel) the location of the central hole 36. As an installation step, the installer drills upward as shown in FIG. 4, with the drill bit 42 extending through the ball receiving tube 14 and through the central hole 36, to form a pilot hole through the bed 32 of the pickup truck 34. For instance, a ¼ inch or larger bit 42 can be used to drill through the central hole 36. By virtue of the installation adapter 12, the pilot hole is exactly in the axial center of the ball receiving tube 14. Alternatively, the installation adapter 12 could be used to provide a locational indicator other than a pilot hole, such as a dent, punch or marking upward, which dent, punch or marking is then viewable in the pickup truck bed 32. As another alternative, the installation adapter 12 could identify a cutting location other than a drilled pilot hole, to cut upward into the pickup truck bed 32, as would often be the case if the hole through the bed 32 was rectangular rather than circular.

Once the pilot hole is drilled through the pickup truck bed 32, the installer then uses the pilot hole from above as the pilot hole for a hole saw 44, with the outer diameter of the hole saw 44 matching the inside diameter, or more preferably the outside diameter of the ball receiving tube 14. For example, when the hitch 10 being installed includes a cylindrical ball receiving tube 14 having a 4 inch outer diameter, a 4 inch diameter hole can be sawed while using the preferred embodiment of the installation adapter 12. The pilot hole centers the 4 inch diameter opening through the pickup truck bed 32 relative to the location of the underbed portion of the hitch 10, i.e, not necessarily centered right to left or front to back in the bed 32 of the pickup truck 34, but in any event at the exact location desired to mate with the location of the underbed portion of the hitch 10. The installer saws the hole in a downward direction with a hose saw 44 as shown in FIGS. 4 and 4A, until all the way through the sheet material of the bed 32 and into the installation adapter 12.

A second important role of the top portion 22 is to provide support and protection during cutting through the truck bed 32 from above, essentially acting as a trim shield for the hitch 10. The top portion 22 of the installation adapter 12 preferably extends beyond the tabs 24 to a peripheral portion 46 having a diameter wider that the hitch ball cylinder 14 of the underbed portion of the hitch 10, i.e., the peripheral portion 46 is wide enough that the circular hole saw blade 44 contacts it when sawing through the bed 32. In the preferred embodiment designed for a hitch 10 with a 4 inch outer diameter ball receiving tube 14, the outer diameter of the top portion 22 is about 4¼ inches in diameter. The top portion 22 thus supports the sheet material of the pickup truck bed 32 from below when the hole is being drilled/sawed from above, resulting in a cleaner hole formed by the hole saw 44. During this time, the top portion 22 of the installation adapter 12 protects the top edge of the ball receiving tube 14 from contact with the hole saw 44.

In the preferred embodiment, the installation adapter 12 is molded out of a brightly colored polymer or plastic material. The installer realizes that the hole saw 44 has reached the installation adapter 12 not only because the installation adapter 12 is generally softer and easier to saw through than the sheet metal or similar material of the pickup truck bed 32, but also when the installer can see the bright color of the installation adapter 12 (by removing the hole saw 44 from the hole being cut) or more commonly because the bright color saw dust appears on the top of the hole being cut.

The top portion 22 is relatively thin, but has enough thickness to provide dimensional stability to the installation adapter 12 and protection for the top edge of the ball receiving tube 14 during shipping and during hole saw cutting. The top portion 22 should also have sufficient thickness to provide support and saw-through feedback during the hole sawing of the pickup truck bed 32. In the preferred embodiment, the top portion 22 has a thickness of about $1/16^{th}$ of an inch.

The top portion 22 could be formed as a single continuous circular disk. The preferred embodiment, however, provides a top portion 22 with a plurality of arms 48 extending outward from the center hole 36, such as the four arms 48 shown. Providing the top portion 22 as spaced arms 48 provides several additional benefits.

First, the spaces between the arms 48 can be used to assist in removing or cutting off the arms 48 after use of the hole saw 44 has been completed. The hole saw 44 is used only to cut through the bed 32 of the pickup truck 34, with the adapter 12 separating the hole saw 44 from contacting the underlying hitch structure 10. Once there is a hole through the sheet material of the bed 32 (and the plug removed), the center portion of the adapter 12 is visible from above. In most cases, the flexibility of the arms 48 of the installation adapter 12 enables the entire installation adapter 12 to be removed by pulling on the center hole 36 upward. Alternatively, a knife blade or similar tool (not shown) can be used to complete the circular cut through the arms 48 of the adapter 12, without cutting into the underlying hitch structure 10. This leaves a center cross-shaped section, which can be removed from the ball tube 14 from above through the newly cut hole in the bed 32, and a thin outer strip of the peripheral portion 46 for each arm 48 which falls off below the bed 32. The final cutting step is necessary if the hitch 10 needs to be raised slightly such that the top of the ball tube 14 is above the bottom face 30 of the bed sheet material 32. The spaces between the arms 48 are useful in this final cutting step, providing locations to easily insert the knife blade and start the knife cutting of the arms 48.

Second, the separation between the arms 48 provides more flexibility to each arm 48. Such flexibility can be helpful if the bottom face of the bed 32 is not entirely planar.

Third, the preferred embodiment includes four arms 48, with each arm 48 primarily defined by five edges 50, 52, 54. Starting nearest the center hole 36, straight edges 50 (eight straight edges 50 in total, two per arm 48) of about ¾ of an inch long proceed at a right angle 56 (four right angles 56 total) relative to the adjacent edge 50 of the next arm 48. At a radius of about 1 inch, each edge forms an obtuse angle 58 (eight obtuse angles 58 in total, two per arm 48) before proceeding to a straight section 52 (eight straight sections 52 in total, two per arm 48) of about 1 inch long. Then each edge has an acute angle 60 (eight acute angles 60 in total, two per arm 48) before merging into the circular outer profile 54 (four circular outer profiles 54 in total). For some makes/models of pickup trucks, there may be intervening structure (not shown) close to the bottom of the ball receiving tube 14 that makes it difficult to position the drill and drill the pilot hole with the underbed hitch 10 in place. If so, the position of the adapter 12 can be uniquely recorded by marking along any two adjacent edges 50, 52, 54. Then, after the underbed hitch 10 has been moved to a non-obstructing location, the two markings can be used to reposition the adapter 12 at the identical location, with the center hole 36 used for designating the location of the pilot hole.

Finally, the spaces between the arms 48 allow the adapter 12 to provide an ornamental appearance associated with the exact shape of the arms 48.

The installation adapter 12 of the present invention thus serves as a low cost mechanism to simplify and improve the accuracy of installation of the hitch 10. While a single installation adapter could be used for multiple installations, the preferred installation method sacrifices the installation adapter 12 due to cutting by the drill bit 42, hole saw 44 and knife (if any). The installation adapter 12 can also serve to protect the hitch 10 during shipping and handling.

It can readily be seen that the shape of the preferred embodiment could be easily modified to provide the same benefits for use with different underbed structures of gooseneck hitches. For instance, if the underbed hitch structure does not have a cylindrical ball receiving tube 14, the tabs 24 can be made into whatever type of profile mates with the underbed hitch structure. Similarly, if the hole through the bed 32 is rectangular rather than circular, then the outer profile of the adapter 12 can be rectangular rather than circular.

Although the present invention has been described with reference to preferred embodiments, workers skilled in the art will recognize that changes may be made in form and detail without departing from the spirit and scope of the invention.

The invention claimed is:

1. An installation adapter for use in installing an underbed portion of a hitch in a pickup truck, comprising:
 a top portion, the top portion having a top side for abutting a bottom side of the bed of the pickup truck and having a bottom side opposite the top side;
 a designation on the top portion, identifiable from underneath the bottom side of the top portion, for indicating a cutting location to cut upward into the pickup truck bed; and
 a positioning portion, extending downward from the top portion, the positioning portion being adapted to be received in the underbed portion of the hitch so as to position the designation such that cutting upward into the pickup truck bed at the cutting location centers an opening through the pickup truck bed relative to the underbed portion of the hitch, wherein the positioning portion comprises a cylindrical grip including a plurality of tabs extending generally vertically downward from the top portion, the plurality of tabs jointly defining a cylindrical profile for gripping onto a hitch ball cylinder of the underbed portion of the hitch.

2. The installation adapter of claim 1, wherein the designation is a hole through the top portion of the installation adapter.

3. The installation adapter of claim 1, wherein the plurality of tabs are flexible relative to the top portion to provide a grip force when the tabs are deflected.

4. The installation adapter of claim 3, wherein the cylindrical profile has an outer diameter of about 2¾ inches, for mating into the hitch ball cylinder.

5. An installation adapter for use in installing an underbed portion of a hitch in a pickup truck, comprising:
 a top portion, the top portion having a top side for abutting a bottom side of the bed of the pickup truck and having a bottom side opposite the top side;
 a designation on the top portion, identifiable from underneath the bottom side of the top portion, for indicating a cutting location to cut upward into the pickup truck bed, wherein the designation is in a center of the top portion; and
 a positioning portion, extending downward from the top portion, the positioning portion being adapted to be received in the underbed portion of the hitch so as to position the designation such that cutting upward into the pickup truck bed at the cutting location centers an opening through the pickup truck bed relative to the underbed portion of the hitch, and wherein the top portion comprises a plurality of arms extending outward from the center and being generally planar with the center, the plurality of arms defining a plurality of open spaces therebetween.

6. The installation adapter of claim 5, wherein the positioning portion comprises a cylindrical grip for gripping onto a hitch ball cylinder of the underbed portion of the hitch.

7. The installation adapter of claim 6, wherein the top portion extends outward from the designation to a trim shield extension at a diameter wider than the hitch ball cylinder of the underbed portion of the hitch.

8. The installation adapter of claim 7, formed of a colored polymer.

9. The installation adapter of claim 5, wherein each of the plurality of arms comprise a plurality of edges, and wherein angles between any adjacent pair of the plurality of edges identify a single position for the center.

10. An installation adapter for use in installing an underbed portion of a hitch in a pickup truck, comprising:
    a top portion, the top portion having a top side for abutting a bottom side of the bed of the pickup truck;
    an opening on the top portion, for providing a locational indicator upward from beneath the bed of the pickup truck, with the location indicator viewable from above in the pickup truck bed;
    a perimeter portion on the top portion, the perimeter portion extending outward to a location corresponding to an opening through the pickup truck bed for providing access to the underbed portion of the hitch therethrough, such that the perimeter portion shields trim on the hitch during cutting of the opening through the pickup truck bed based upon the locational indicator; and
    a positioning portion, extending downward from the top portion within an outline of the perimeter portion, the positioning portion defining a cylindrical profile being adapted to be received on the inside diameter of a 2¾ inch diameter cylindrical opening in the underbed portion of the hitch so as to position the designation such that cutting upward into the pickup truck bed at the cutting location centers an opening through the pickup truck bed relative to the underbed portion of the hitch;
    wherein the perimeter portion extends to cover at least part of a 4 inch diameter circle centered on an axis of the cylindrical profile, for shielding of trim of 4 inch diameter on the hitch.

11. The installation adapter of claim 10, wherein the opening is a hole through a center of the top portion.

12. The installation adapter of claim 10, formed of a colored polymer.

13. A method of installing a gooseneck hitch relative to the bed of a pickup truck, comprising:
    placing an installation adapter onto the top of an underbed portion of the gooseneck hitch, the installation adapter having a designation identifiable from underneath;
    locating the underbed portion of the gooseneck hitch relative to the pickup truck, with the installation adapter on the hitch; and
    forming an opening upward at the designation and through the bed of the pickup truck.

14. The method of claim 13, wherein the designation is a hole through the installation adapter, and wherein the act of forming an opening comprising drilling through the hole upward to form a pilot hole through the bed of the pickup truck.

15. The method of claim 14, further comprising using the pilot hole with a hole saw to saw downward and thereby form a hole through the bed of the pickup truck which receives a hitch ball therethrough.

16. The method of claim 15, wherein the installation adapter comprises a perimeter portion extending to the hole saw cut, such that the act of sawing downward through the bed of the pickup truck cuts at least partially into the perimeter portion of the installation adapter.

17. The method of claim 16, wherein the installation adapter is formed of a colored plastic, and wherein visibility of colored plastic saw dust on the top side of the bed of the pickup truck indicates that the bed has been sawed through.

18. The method of claim 13, wherein the installation adapter comprises a cylindrical grip for gripping onto a hitch ball cylinder of the underbed portion of the hitch.

19. The method of claim 18, wherein the cylindrical grip comprises a plurality of tabs jointly defining a cylindrical profile.

20. The method of claim 19, wherein the cylindrical profile has an outer diameter of about 2¾ inches, for mating into the hitch ball cylinder.

* * * * *